United States Patent

Keijsper et al.

[11] Patent Number: 5,420,236
[45] Date of Patent: May 30, 1995

[54] PROCESS FOR THE PREPARATION OF COPOLYMERS

[75] Inventors: Johannes J. Keijsper; Arleen M. Bradford; Andre Buys, all of Amsterdam, Netherlands

[73] Assignee: Shell Oil Company, Houston, Tex.

[21] Appl. No.: 212,471

[22] Filed: Mar. 11, 1994

[30] Foreign Application Priority Data

Mar. 12, 1993 [EP] European Pat. Off. ............ 93200737

[51] Int. Cl.$^6$ ............................................. C08G 67/02
[52] U.S. Cl. ...................................... 528/392; 528/271
[58] Field of Search ............................... 528/271, 392

[56] References Cited

U.S. PATENT DOCUMENTS

| | | | |
|---|---|---|---|
| 4,778,876 | 10/1988 | Doyle et al. | 528/392 |
| 4,806,630 | 2/1989 | Drent et al. | 528/392 |
| 4,818,811 | 4/1989 | Drent | 528/392 |
| 4,843,144 | 6/1989 | Van Broekhoven et al. | 528/392 |

*Primary Examiner*—Melvyn I. Marquis
*Assistant Examiner*—Shelley A. Dodson

[57] ABSTRACT

A process for the preparation of copolymers by reacting carbon monoxide and one or more ethylenically unsaturated compounds under polymerizable conditions in the substantial absence of a liquid non-polymerizable diluent and in the presence of a catalyst system consisting essentially of:
(a) a source of cations of one or more noble metals of Group VIII of the Periodic Table;
(b) a source of anions of acids having a pKa of less than 4;
(c) a source of cations of one of more metals selected from the group consisting of nickel, cobalt, manganese, lead, zinc, magnesium, iron (II), copper (II), lanthanum and neodymium and
(d) a source of bidentate ligands.

22 Claims, No Drawings

PROCESS FOR THE PREPARATION OF COPOLYMERS

BACKGROUND OF THE INVENTION

The invention relates to a process for the preparation of copolymers of carbon monoxide with one or more ethylenically unsaturated compounds.

The preparation of copolymers of carbon monoxide and one or more ethylenically unsaturated compounds, in which copolymers the units originating from carbon monoxide substantially alternate with the units originating from the ethylenically unsaturated compounds, has been described in numerous patent publications.

Typically the preparation of the said copolymers is carried out as a liquid phase copolymerization process, whereby the monomers are contacted with a catalyst composition in the presence of a liquid non-polymerizable diluent. The formed copolymers are isolated, for instance, by filtration or centrifugation. Pure diluent is recovered from the remaining liquid, suitably by distillation and can be recycled.

A process whereby the polymerization proceeds in solution or suspension is described e.g. in EP 181,014. In this process the monomers react in the presence of a catalyst, being a complex compound obtained by reaction of a palladium, cobalt or nickel compound, an anion of a carboxylic acid with a pKa lower than 2, and a bidentate ligand.

Another liquid phase process for the preparation of the said copolymers is described in EP 235,865. In this process the catalyst composition is also based on a palladium compound and a bidentate ligand. However, instead of supplying an acid with a pKa lower than 2, a non-noble transition metal salt of the relevant acid is used. This reference discloses that replacement of the acid by the salt in some cases results in a considerable improvement in catalytic activity of the catalyst composition.

While salts of all non-noble transition metals are deemed to be included, special preference is given to salts of zirconium, vanadium, chromium, iron, nickel, copper, cerium, thorium and uranium.

It is further known that the preparation of linear alternating copolymers of carbon monoxide and one or more ethylenically unsaturated compounds can also be carried out in gas-phase operation. According to EP 248,483, the gas phase copolymerization offers considerable advantages, as regards reaction rate, molecular weight and bulk density, in comparison with the liquid phase process. Moreover, the recovery of the formed copolymers is simpler, because the filtration or centrifugation step can be omitted and no distillative removal of liquid diluent is required. When carried out on a technical scale, these advantages result in considerable cost savings.

The catalyst composition used in the gas-phase process is as disclosed in EP 248,483, also based on a palladium compound, an anion of an acid with a pKa of less than 2 and a bidentate ligand. It is stated that the anions may be incorporated in the catalyst composition either in the form of an acid or in the form of a salt. Eligible are salts of non-noble transition metals and main group metals. As very suitable are mentioned salts of zirconium, vanadium, chromium, iron, nickel, copper, cerium, thorium, uranium, aluminum, gallium, tin, lead and antimony.

In EP 248,843 acids and metal salts are disclosed as suitable alternative anion sources, and it is not alleged that by using a metal salt as anion source the catalytic activity of the composition will be enhanced which is in contrast to the findings according to EP 235,865 for liquid phase operation of the process.

In fact, further investigation of this aspect has shown that most of the metal salts, considered useful for enhancing catalytic activity in liquid phase operation of the process, including many salts of those metals, especially preferred for this purpose, do not have any promoting effect on the catalytic activity in gas phase embodiments of the process.

Surprisingly, it has now been found that the activity of catalyst compositions, used in gas-phase operations of the process, is significantly increased, if compositions are used which are based on specific cation sources, particularly in combination with specific anion sources.

SUMMARY OF THE INVENTION

The invention may be defined as relating to a process for the preparation of copolymers by reacting carbon monoxide and one or more ethylenically unsaturated compounds under polymerization conditions in the substantial absence of a liquid non-polymerizable diluent and in the presence of a catalyst consisting essentially of:

a) a source of cations of one or more noble metals of Group VIII of the Periodic Table;
b) a source of anions of acids having a pKa of less than 4;
c) a source of cations of one or more metals selected from the group consisting of nickel, cobalt, manganese, lead, zinc, magnesium, iron (II), copper (II), lanthanum and neodymium; and
d) a source of bidentate ligands

DETAILED DESCRIPTION OF THE INVENTION

In the present specification and claims the term "noble metals of Group VIII of the Periodic Table" denotes the metals ruthenium, rhodium, palladium, osmium, iridium and platinum.

Suitable sources of cations of noble metals of Group VIII include salts of mineral acids, such as salts of sulphonic acid, nitric acid and phosphoric acid, and salts of sulphonic acids, such as methanesulphonic acid and para-toluenesulphonic acid.

Preferred sources are salts of carboxylic acids, such as acetic acid, propionic acid and trifluoroacetic acid. If desired, as a cation source, use may be made of the noble metals in their elemental form, or in a zero-valent state thereof, e.g. in complex form. Usually these sources are used together with a protic acid, so that the metal cations are formed in situ. Also suitable are noble metal compounds containing at least one group, capable of forming a non-covalent bond with the noble metal, in particular compounds which, in addition to a non-covalent bond with a noble metal, comprise a linkage to that metal via a carbon atom.

Catalyst systems comprising palladium cations are most preferred. A preferred source of these cations is palladium (II) acetate.

Component (b) of the catalyst systems is based on anions of acids having a pKa value of less than 4, determined in aqueous solution at 18° C. These anions do not, or only weakly, coordinate with the cations of the noble metal. Preferably the anions are derived of strong acids having a pKa value of less than 2, with the exception of hydrohalogenic acids. Halide anions tend to coordinate relatively strongly with the noble metal cation, and are therefore preferably not incorporated in the catalyst system.

The amount of anions (component b) is not critical. Typically, such anions are present in an amount of from about 0.5 to 200, preferably of from about 1 to 50, and most preferably of from about 1 to 10 equivalents per gram atom of Group VIII metal.

It has been observed that a decline in reaction rate may, at least partly, be caused by the instability of one or more components of the catalyst system. In order to minimize a rate decline it is therefore considered important to select sources of anions which under the reaction conditions, do not decompose to any significant extent.

Furthermore, it has been observed that in selecting suitable anion sources for the catalyst system of the invention, steric factors may be of relevance as well, Preferably therefore, as regards (b), the catalyst system is based on a source of relatively bulky anions.

Examples of preferred anions are anions of strong acids such as perchloric acid, para-toluenesulphonic acid, trifluoromethane sulphonic acid and tetrafluoroboric acid and anions of bulky acids such as naphthalenesulphonic acid. Perchloric acid is a strong and very stable acid and, accordingly, catalyst systems in which anions of this acid are incorporated, are especially preferred.

Component (c) of the catalyst systems of the invention is based on a source of cations of one or more of the metals nickel, cobalt, manganese, lead, zinc, magnesium, iron (II), copper (II), lanthanum and neodymium. Of these cations, those of the group consisting of cobalt, manganese, nickel, zinc, iron (II), magnesium and lead are preferred. Particularly preferred are cations of cobalt, manganese and/or nickel.

As a source of cations of the said metals, generally a metal salt is selected which is suitably derived from one of the acids mentioned above in connection with the sources (a) of cations of noble metals of Group VIII and the sources (b) of anions of acids having a pKa of less than 4.

According to a particularly preferred embodiment of the invention, a salt is selected which can provide an anion suitable for use as (b) and a cation, suitable for use as (c). Thus, preferred catalyst systems are based on metal salts capable of providing anions for (b) and cations for (c), such as nickel perchlorate, nickel trifluoromethanesulfonate, cobalt perchlorate, manganese perchlorate and zinc trifluoromethanesulfonate. Particularly preferred are catalyst systems which as regards (b) and (c), are based on cobalt-, manganese-, or nickel perchlorate.

The amount of metal salt utilized in the catalyst composition is not critical, but generally the molar quantity of metal salt used is in the range of from about 1 to 50 per gram atom of noble metal of Group VIII.

Component (d) of the catalyst system is based on a source of bidentate ligands. It would appear that the presence of two complexing sites in one molecule significantly contributes to the formation of stable catalysts.

A preferred group of bidentate ligands can be indicated by the general formula $$R^1R^2M^1R\ M^2R^3R^4 \qquad (I)$$

In this formula each of $M^1$ and $M^2$ independently represents a phosphorus, arsenic, antimony or nitrogen atom, each of $R^1$, $R^2$, $R^3$ and $R^4$ independently represents a substituted or non-substituted hydrocarbyl group and R represents a divalent organic bridging group containing 1 to 5 atoms in the bridge.

Other suitable bidentate ligands are for example bis thio compounds such as 1,2-bis(ethylthio)ethane and 1,2-bis(propylthio)ethene, mixed ligands such as 1-diphenylphosphino-3 ethylthiopropane and compounds having two nitrogen containing rings such as bipyridine and 1,10-phenanthroline.

In the ligands of formula (I) $M^1$ and $M^2$ preferably represent phosphorus atoms. $R^1$, $R^2$, $R^3$ and $R^4$ may independently represent optionally substituted alkyl, aryl, alkaryl, aralkyl or cycloalkyl groups. Preferably at least one of $R^1$, $R^2$, $R^3$ and $R^4$ represents an aromatic group, in particular an aromatic group substituted by one or more polar groups.

Suitable polar groups include halogen atoms, such as fluorine and chlorine, alkoxy groups such as methoxy and ethoxy groups and alkylamino groups such as methylamino-, dimethylamino-and diethylamino groups.

If one or more of $R^1$, $R^2$, $R^3$ and $R^4$ represents a substituted aryl group, preference is given to a phenyl group substituted at one or both ortho positions with respect to $M^1$ or $M^2$, with an alkoxy group, preferably a methoxy group.

In the ligands of formula (I), R preferably represents a divalent organic bridging group containing from 2 to 4 bridging atoms, at least two of which are carbon atoms.

Examples of suitable groups R are: —CH$_2$—CH$_2$—; —CH$_2$—CH$_2$—CH$_2$—; —CH$_2$—Si(CH$_3$)$_2$—CH$_2$—; —CH$_2$—C(CH$_3$)$_2$—CH$_2$; and —CH$_2$—CH$_2$—CH$_2$—CH$_2$—. Preferably R is a trimethylene group.

The amount of bidentate ligand supplied may vary considerably, but is usually dependent on the amount of noble metal of Group VIII, present in the catalyst system. Recommended amounts of bidentate ligands are in the range of from 0.5 to 8, preferably in the range of from 0.5 to 2 moles per gram atom of noble metal of Group VIII.

In some embodiments the stability of the catalyst system is increased by incorporating a promotor therein. Suitably, an organic oxidant promoter is used, such as a quinone. Preferred promoters are selected from the group consisting of benzoquinone, naphthoquinone and anthraquinone. The amount of promoter is advantageously in the range of from 1-50, preferably in the range of from 1 to 10 mol per gram atom of noble metal of Group VIII.

Preferably, in the process of the invention use is made of a catalyst system supported on a carrier, usually in order to facilitate the introduction of the catalyst system into the reactor. Suitable carrier materials may be inorganic, such as silica, alumina or charcoal, or organic such as cellulose or dextrose. Furthermore, a polymer material such as polyethene, polypropene or a copolymer such as a copolymer of carbon monoxide with an ethylenically unsaturated compound may be used as carrier. Conveniently the carrier is impregnated with a solution of the catalyst system in a suitable solvent. Polar solvents are preferred, such as lower alcohols, for example methanol and ethanol; ethers such as diethylether or the dimethylether of diethylene glycol (diglyme) and ketones such as acetone and methylethylketone. It will be appreciated that the amount of solvent used, is relatively small, so that any excess of solvent can easily be removed before or during the initial stage of the copolymerization process. On the other hand it has been observed that the presence of a minor amount of liquid during the process has a delaying effect on the deactivation rate of the catalyst system, provided the continuous phase in which the copolymerization takes place is formed by carbon monoxide and possibly one or more of the other monomers, if present in the reactor in gaseous form.

The amount of catalyst used in the process of the invention may vary between wide limits. Recommended amounts are in the range of from $10^{-8}$ to $10^{-2}$, calculated as gram atoms of noble metals(s) of Group VIII, per molecule of ethylenically unsaturated compound to be copolymerized with carbon monoxide. Preferred amounts are in the range of from $10^{-7}$ to $10^{-3}$ on the same basis.

Ethylenically unsaturated compounds suitable to be used as monomers in the copolymerization process of the invention include compounds consisting exclusively of carbon and hydrogen and compounds which in addition comprise one or more heteroatoms, such as unsaturated esters. Unsaturated hydrocarbons are preferred.

Examples of suitable monomers are lower olefins, i.e. olefins containing from 2 to 6 carbon atoms, such as ethene, propene and butene-1, cyclic olefins such as cyclopentene, aromatic compounds, such as styrene and alpha-methylstyrene and vinyl esters, such as vinylacetate and vinylpropionate. Preference is given to ethene and mixtures of ethene and propene.

Generally, the molar ratio between on the one hand carbon monoxide and on the other hand the ethylenically unsaturated compound(s), is selected in the range of from 1:5 to 5:1. Preferably the molar ratio is in the range of from 1.5:1 to 1:1.5, with substantially equimolar ratios being particularly preferred.

The copolymerization process is usually carried out at a temperature between 20° and 200° C., preferably at a temperature in the range of from 30° to 150° C. The reaction is conveniently performed at a pressure between 2 and 200 bar, with pressures in the range of from 20 to 100 bars being preferred.

The copolymers obtained according to the invention are suitable as thermoplastics for fibers, films or sheets, or for injection molding, compression molding and blowing applications. They may be used for applications in the car industry, for the manufacture of packaging materials for food and drinks and for various uses in the domestic sphere.

The invention is further illustrated by the following non-limiting examples.

EXAMPLE 1

Copolymerization of Carbon Monoxide and Ethene

A catalyst solution was prepared as follows: 57.4 mg (1.1 mole eq.) of 1,3-bis (di-ortho-methoxy phenylphosphino) propane were dissolved in 2.5 mL of tetrahydrofuran. After complete dissolution, the solution was added to 1 mole eq. of palladium (II) acetate (22.0 mg). Subsequently 17.5 mL of methanol was added and the mixture was stirred for 1 hour to form a clear light brown solution. 2.5 mole eq. of nickelperchlorate was added and subsequently 2.15 mole of naphthoquinone (33.4 mg) was dissolved. Of this solution, 2.0 mL was taken and diluted with 2.0 mL of methanol.

The resulting 4.0 mL of diluted catalyst solution, together with 8 gram of a dried, previously prepared terpolymer of carbon monoxide, ethene and propene, was charged to a 0.5L Medimex autoclave equipped with a fixed stirring device and an automatic pressure relief.

Subsequently, the reactor was closed and pressurized at 50 bar with nitrogen. The pressure was released and the autoclave was purged twice with carbon monoxide, (6 bar), after which it was pressurized with carbon monoxide (20 bar) and ethene (20 bar).

The contents of the reactor were heated to 55° C. and the supply of carbon monoxide/ethene feed was started.

A solution of 111.3 mg of naphthoquinone in 100 mL of methanol was added at a rate of 2.0 mL/mg palladium and per hour, starting 0.5 hour after the beginning of the reaction (defined as the moment that the temperature of the reaction mixture reached 60° C.).

The copolymerization reaction was stopped by the automatic pressure relief after a reaction period of 5 hours. The product was recovered, dried overnight in a vacuum oven under a nitrogen purge at 50° C. and weighed.

The average and maximum temperature, the overall and maximum rate and the LVN of the copolymer are indicated in Table 1.

LVN=Limiting Viscosity Number, the intrinsic viscosity, calculated from determined viscosity values, measured for different copolymer concentrations in m-cresol at 60° C.

EXAMPLES 2–10

In each of these experiments, a copolymer of carbon monoxide and ethene was prepared, substantially as described in Example 1, with the difference that instead of nickel-perchlorate, 2.5 mole eq. of the following metal salts were used.

| | |
|---|---|
| Example 2 | Lanthanum perchlorate |
| Example 3 | copper (II) perchlorate |
| Example 4 | cobalt perchlorate |
| Example 5 | zinc perchlorate |
| Example 6 | ferro perchlorate |
| Example 7 | manganese perchlorate |
| Example 8 | magnesium perchlorate |
| Example 9 | lead perchlorate |
| Example 10 | neodymium perchlorate |

The results (temperature, catalyst activity and LVN) are shown in Table 1.

COMPARATIVE EXAMPLE A (NOT ACCORDING TO THE INVENTION)

A copolymer of carbon monoxide and ethene was prepared, substantially as described in Example 1, with the difference that instead of nickel perchlorate, 2.5 mole eq. of perchloric acid was used.

The results are shown in Table 1.

COMPARATIVE EXAMPLE B (NOT ACCORDING TO THE INVENTION)

A copolymer of carbon monoxide and ethene was prepared, substantially as described in Example 1, with the difference that instead of nickel perchlorate, 1.7 mole eq. of chromium (III) perchlorate was used.

The results are shown in Table 1.

TABLE 1

| Example No. | Temperature (°C.) Average | Temperature (°C.) Maximum | Catalytic activity (kg/g Pd · h) Overall | Catalytic activity (kg/g Pd · h) Maximum | LVN (dL/g) |
|---|---|---|---|---|---|
| 1 | 91.5 | 92.0 | 16.8 | 18.3 | 2.3 |
| 2 | 90.0 | 91.5 | 12.5 | 14.0 | 2.9 |
| 3 | 93.1 | 96.4 | 14.2 | 16.9 | — |
| 4 | 89.6 | 93.0 | 16.2 | 19.7 | 2.2 |
| 5 | 91.3 | 93.6 | 15.1 | 18.2 | 2.4 |
| 6 | 90.2 | 93.5 | 14.5 | 17.2 | 2.6 |
| 7 | 89.8 | 93.5 | 15.4 | 18.0 | 2.5 |
| 8 | 91.8 | 94.5 | 14.7 | 17.9 | 2.1 |
| 9 | 90.5 | 94.0 | 15.2 | 17.4 | 2.2 |
| 10 | 89.1 | 92.8 | 11.2 | 14.5 | n.d. |
| A | 86.7 | 91.3 | 7.5 | 9.8 | 2.7 |
| B | 89.9 | 92.9 | 7.1 | 9.6 | 2.6 |

EXAMPLES 11-14

In each of these experiments, a copolymer of carbon monoxide and ethene was prepared, substantially as described in Example 1, with the difference that instead of nickel perchlorate, 2.5 mole eq of the following metal salts were used.

| Example 11 | nickel naphthalenesulfonate |
| Example 12 | nickel trifluoromethanesulfonate |
| Example 13 | nickel tetrafluoroborate |
| Example 14 | zinc trifluoromethanesulfonate |

The results are shown in Table 2.

COMPARATIVE EXAMPLE C (NOT ACCORDING TO THE INVENTION)

A copolymer of carbon monoxide and ethene was prepared substantially as described in Example 11, with the difference that instead of nickel naphthalenesulfonate, 2.5 mole eq. of naphthalenesulphonic acid was used. The results are shown in Table 2.

TABLE 2

| Example No. | Temperature (°C.) Average | Temperature (°C.) Maximum | Catalytic activity (kg/g Pd · h) Overall | Catalytic activity (kg/g Pd · h) Maximum | LVN (dL/g) |
|---|---|---|---|---|---|
| 11 | 91.6 | 95.7 | 16.3 | 19.5 | 2.2 |
| 12 | 91.0 | 91.8 | 14.8 | 15.7 | 2.6 |
| 13 | 90.2 | 92.6 | 13.1 | 16.5 | 2.4 |
| 14 | 91.3 | 93.6 | 14.6 | 17.4 | 2.4 |
| C | 91.2 | 93.3 | 6.5 | 7.5 | 2.2 |

COMPARATIVE EXAMPLE D (NOT ACCORDING TO THE INVENTION)

In the manner as described in Example 1 an experiment was carried out whereby, instead of nickel perchlorate, 2.5 mole eq. of vanadium perchlorate was used. During the preparation of the catalyst solution, decomposition of the vanadium compound occurred, and that the effect, (if any), of this metal salt on the catalytic activity could not be determined.

While this invention has been described in detail for the purpose of illustration, it is not to be construed as limited thereby but is intended to cover all changes and modifications within the spirit and scope thereof.

What is claimed is:

1. A process for the preparation of copolymers by reacting carbon monoxide and one or more ethylenically unsaturated compounds under polymerization conditions in the substantial absence of a liquid non-polymerizable diluent and in the presence of a catalyst system consisting essentially of:
   (a) a source of cations of one or more noble metals of Group VIII of the Periodic Table;
   (b) a source of anions of acids having a pKa of less than 4;
   (c) a source of cations of one or more metals selected from the group consisting of manganese, lead, zinc, magnesium, iron (II), copper (II), lanthanum, and neodymium; and
   (d) a source of bidentate ligands.

2. A process as in claim 1 wherein component (a) of said catalyst system is a salt of a noble metal of Group VIII and a carboxylic acid.

3. A process as in claim 2 wherein component (a) of said catalyst system is palladium (11) acetate.

4. A process as in claim 1 wherein component (b) of said catalyst system is an anion of a non-hydrohalogenic acid having a pka of less than 2.

5. A process as in claim 4 wherein said anion is a member of the group consisting of $HClO_4$, $CF_3SO_3H$, $HBF_4$, or naphthalenesulfonic acid.

6. A process as in claim 1 wherein component (c) of said catalyst system is a cation of one or more metal selected from the group consisting of cobalt, manganese, nickel, zinc, iron (11), magnesium or lead.

7. A process as in claim 1 wherein in said catalyst system, component (b) is an anion of an acid salt having a pka of less than 4, and component (c) is a cation of a metal selected from the group consisting of nickel, cobalt, manganese, iron (11), copper (11), lanthanum or neodymium.

8. A process as in claim 7 wherein said components (b) and (c) are based on cobalt, manganese, or nickel perchlorate.

9. A process as in claim 1 wherein in said catalyst system the molar amount of component (c) to component (a) is within the range of 1–50 per gram atom.

10. A process as in claim 1 wherein component (d) of said catalyst system is based on a bidentate ligand comprising two phosphorus, arsenic, antimony, nitrogen or sulfur atoms capable of forming a complex with the noble metal(s) of Group VIII.

11. A process as in claim 10 wherein said bidentate ligand has the general formula $$R^1R^2M^1RM^2R^3R^4 \qquad (I)$$

wherein each of $M^1$ and $M^2$ independently represents a phosphorus, arsenic, antimony or nitrogen atom, each of $R^1$, $R^2$, $R^3$, and $R^4$ independently represents a substituted or non-substituted hydrocarbyl group and R represents a bivalent bridging group containing 1 to 5 atoms in the bridge.

12. A process as in claim 11, wherein said bidentate ligand of formula (I) $M^1$ and $M^2$ represent phosphorus atoms, each of $R^1$, $R^2$, $R^3$ and $R^4$ independently represents a non-substituted or polar substituted aryl group and R represents a bivalent bridging group containing 2 to 4 carbon atoms in the bridge.

13. A process as in claim 11 wherein said bidentate ligand of formula (I) each of $R^1$, $R^2$, $R^3$ represents an ortho-alkoxyphenyl group and R represents a trimethylene group.

14. A process as in claim 1 wherein in said catalyst system, the molar amount of component (d) to component (a) is within the range of from 0.5 to 2 moles per gram atom.

15. A process as in claim 1 wherein said catalyst system further comprises a promoter comprising an organic oxidant.

16. A process as in claim 15 wherein said promoter is a member of the group consisting of benzoquinone, naphthoquinone, or anthraquinone.

17. A process as in claim 15 wherein said catalyst system is supported on a carrier.

18. A process as in claim 1 wherein said reaction temperature is from 20°-200° C., at a pressure of from 2-200 bar.

19. A copolymer produced by the process of claim 1.

20. An article of manufacture produced from the copolymer of claim 19.

21. A process for the preparation of copolymers by reacting carbon monoxide and one or more ethylenically unsaturated compounds under polymerization conditions in the substantial absence of a liquid non-polymerizable diluent and in the presence of a catalyst system comprising:
- (a) a source of cations of one or more noble metals of Group VIII of the Periodic Table;
- (b) a source of anions of acids having a pKa of less than 4;
- (c) a source of cations of one or more metals selected from the group consisting of nickel, cobalt, manganese, lead, zinc, magnesium, iron (II), copper (II), lanthanum, and neodymium; and
- (d) a source of bidentate ligands;

wherein said anions of (b) and said cations of (c) are obtained from a single salt.

22. The process of claim 21 wherein said source of said anions of (b) and said cations of (c) is selected from the group consisting of nickel trifluoromethanesulfonate, nickel perchlorate, cobalt perchlorate, manganese perchlorate, and zinc trifluouromethanesulfonate.

* * * * *